No. 703,504. Patented July 1, 1902.
J. W. B. TURK.
NUT LOCK.
(Application filed Oct. 29, 1900.)
(No Model.)
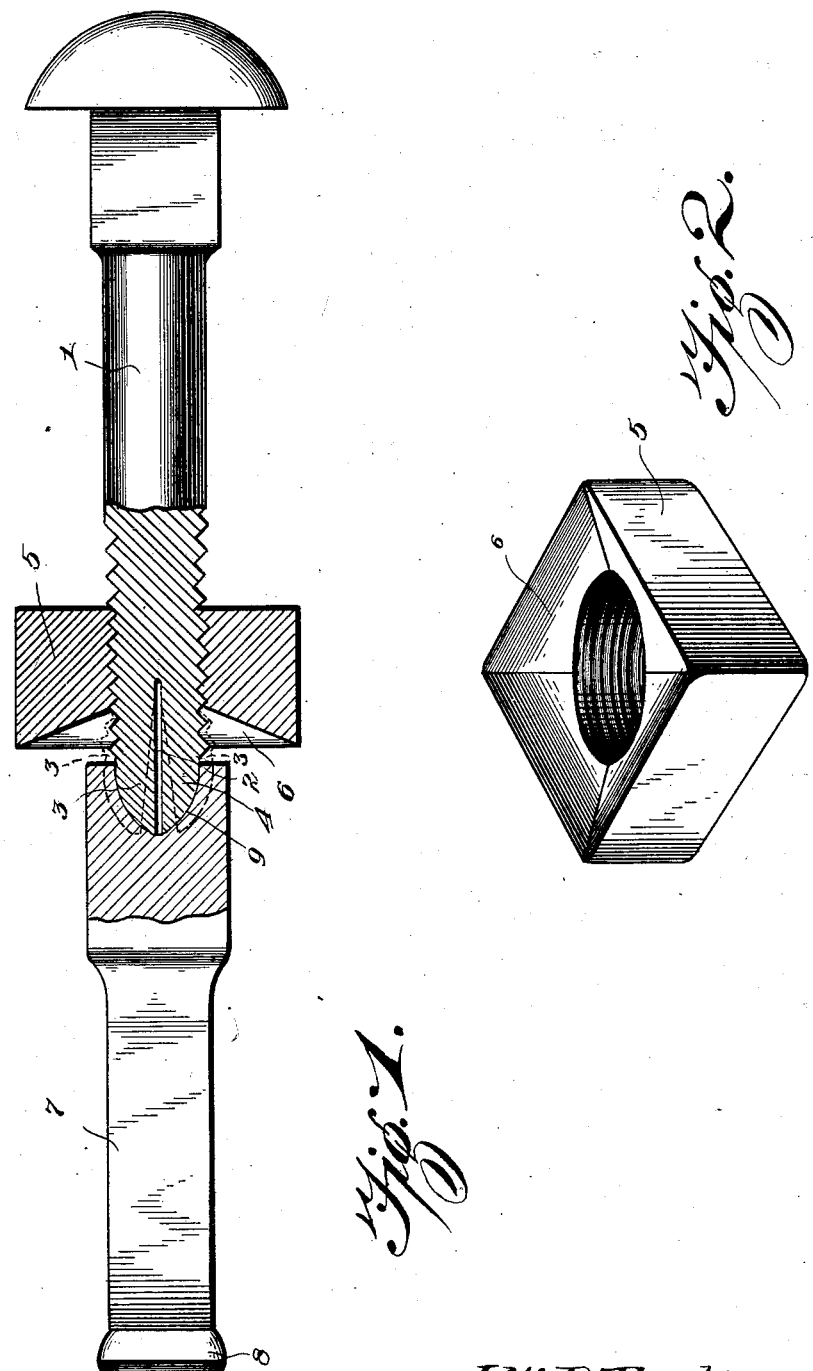

UNITED STATES PATENT OFFICE.

JAMES W. B. TURK, OF POTEAU, INDIAN TERRITORY.

NUT-LOCK.

SPECIFICATION forming part of Letters Patent No. 703,504, dated July 1, 1902.

Application filed October 29, 1900. Serial No. 34,844. (No model.)

*To all whom it may concern:*

Be it known that I, JAMES W. B. TURK, a citizen of the United States, residing at Poteau, in the Choctaw Nation, Indian Territory, have invented a new and useful Nut-Lock, of which the following is a specification.

This invention relates to nut-locks, and particularly to that class in which the outer end of the bolt is cleft longitudinally to present nut-locking members, which are spread to hold the nut from turning on the bolt and are brought together again when the nut is to be removed.

As is well known, however meritorious an invention of this character may be, and even though a railroad should desire to adopt it, if its employment would necessitate any change in the standard sizes in the bolts and nuts and of the fish-plates such requirement would be fatal to its adoption.

The object of the present invention is without increasing the length of an ordinary bolt, such as is used for securing rail-joints together, to adapt the same to effect locking of a nut thereon. Under ordinary conditions the projecting end of a bolt—say on the fish-plate—is too short to permit of its being spread, or if spread it would be impossible without destroying the threads to retract or bring together the cleft portions.

A further object of this invention is without reducing the areas of the wrench-surfaces of the nut to construct the same in such manner as to permit the nut-locking members to be spread or brought together. With bolts that are cleft in the manner described should the nut-locking member from any cause, as from a stripped or mutilated thread, become jammed when the cleft portion is wholly within the nut it will be impossible to insert a tool to effect further retraction of the nut-locking members.

A further object of this invention is so to construct the nut-locking members that a tool may be applied thereto to effect their closer assemblage when the same are wholly within the nut.

The various objects above defined are accomplished in a ready, simple, inexpensive, and practical manner. In the case of the bolt a portion of the end is reduced in diameter and tapered to a point, and this tapered terminal is cleft, the cleft extending some distance into the threaded portion. It will be seen under this arrangement that a socket-tool of less external diameter than the internal diameter of the bolt-opening may be employed for the purpose of closing the nut-locking members, so that in case the nut should become jammed on the bolt when the same is partially removed the tool can be inserted within the bolt-opening to effect further retraction of the said members.

In the case of the nut the outer face is countersunk or concaved from its bolt-opening outward to its periphery, thereby permitting the nut-locking members to be spread and retracted, which could not be accomplished if the outer face of the nut were flat and the members very short. This countersinking of the face of the nut does not effect any reduction in the areas of the wrench-surfaces of the nut, and the end of the bolt only projects beyond the outer face of the nut when viewed from above the same distance as that of an ordinary bolt.

With these and other objects in view, as will appear as the nature of the invention is better understood, the same consists in the novel construction and combination of parts of a nut-lock, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in elevation, partly in section, exhibiting the nut-lock illustrating the present invention with the socket-tool applied thereto. Fig. 2 is a perspective detail view of the nut.

Referring to the drawings, 1 designates an ordinary bolt, such as is employed for assembling the joints of a railway-rail. The outer end of the bolt is split or cleft, as at 2, to present nut-locking members 3 and 4, and a length of the cleft portion is tapered and is devoid of threads, this arrangement permitting application to the tapered portion of a socket-tool 7, of less external diameter than the internal diameter of the bolt-opening of the nut, whereby, as above pointed out, should the nut-locking members become jammed in the bolt-opening when the nut is partly removed the tool can be inserted in the nut, and thus effect further retraction of the locking members.

The nut 5, which may be either hexagonal or square, as shown, has that face which will be the outer one in use countersunk or concaved from the bolt-opening outward to the perimeter, by which arrangement when the nut is seated a greater length of the bolt will be presented to be spread or retracted.

As herein shown, the socket-tool 7 has a straight shank or body, provided at one end with a head 8 and at the opposite end with a socket 9 to engage the tapered end of the bolt.

It will be seen from the foregoing description that the present invention provides simple and efficient means for effecting the locking of the nut and also its ready removal when desired.

Having thus fully described my invention, what I claim as new, and desire to secure by Letters Patent, is—

1. A nut-lock comprising a bolt having a portion beyond its threaded section tapered and devoid of threads and cleft, the cleft extending some distance into the threaded portion, and a nut to engage the bolt, the tapered terminal permitting application thereto of a socket-tool of less external diameter than the internal diameter of the bolt-opening when the said terminal is within the bolt-opening.

2. A nut-lock comprising a bolt having a portion beyond its threaded section tapered and devoid of threads and cleft, the cleft extending some distance into the threaded portion, and a nut having its outer face countersunk or concaved from the bolt-opening outward to its perimeter, substantially as and for the purpose specified.

In testimony that I claim the foregoing as my own I have hereto affixed my signature in the presence of two witnesses.

JAMES W. B. TURK.

Witnesses:
J. M. SORRELS,
E. E. DANIEL.